United States Patent Office 3,538,220
Patented Nov. 3, 1970

3,538,220
CONTROL OF NEMATODES WITH PHOSPHORODIAMIDOTHIOATES
George R. Haynes, Clyde W. McBeth, Kurt H. G. Pilgrim, and Lyle V. White, Modesto, Calif., assignors to Shell Oil Company, New York, N.Y., a corporation of Delaware
No Drawing. Original application Jan. 21, 1966, Ser. No. 522,046, now Patent No. 3,454,682, dated July 8, 1969. Divided and this application Mar. 5, 1969, Ser. No. 821,541
Int. Cl. A01n 9/36
U.S. Cl. 424—220          4 Claims

ABSTRACT OF THE DISCLOSURE

Nematocidal phosphoroamidothioates of the formula:

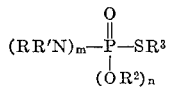

wherein R, $R^1$, and $R^2$ each independently represents a group of 1 to 12 carbon atoms selected from alkyl, alkenyl, chloroalkyl, or bromoalkyl; $R^3=R$, $R^1$, $R^2$, cycloalkyl and alkynyl of up to 12 carbon atoms; $m=2$ when $n=0$ and $m=1$ when $n=1$, are described. Some of these compounds are novel.

---

This is a division of application Ser. No. 522,046, filed Jan. 21, 1966, now U.S. Pat. 3,454,682.

This invention relates to a novel method for protecting plants from attack by nematodes. According to this invention such protection is effected by treating the soil in which the plants are grown or by treating the plants directly. The invention in particular relates to certain phosphoroamidothioates and phosphorodiamidothioates useful to protect plants from nematode attack. It also relates to certain phosphorodiamidothioates which are novel compositions of matter.

To control root infesting nematodes with conventional nematocides the farmer generally has to apply large quantities of the active ingredient per acre. Quantities up to 20 gallons per acre are frequently required for nematode control. Use of such large quantities requires specialized application equipment. Most of the currently employed chemicals such as ethylene dibromide, chloropicrin, and 1,3-dichloropropene are highly volatile and require proper placement in the soil. In addition many of the commercial nematocides are quite phytotoxic and the treated soil must be aerated for extended periods of time prior to planting. In general due to the large quantities of the active pesticide required, the specialized equipment required, and the need to aerate the soil prior to planting, the use of many commercial nematocides has been restricted to a limited number of crops of high value.

It is an object of the present invention to provide a method of controlling nematodes in soil, such method providing residual effectiveness. By residual effectiveness is meant the provision of protection for the growing crop for the duration of its maturation. It is a further object of the method of the invention to provide a class of compounds which will effectively control these plant pests and yet not injure or adversely affect the growing plant. Another object of the invention is to provide a useful class of nematocides which are novel compositions of matter.

Still further objects and the scope of applicability of the invention will become apparent from the description and specific examples which follow.

The objects of the invention are accomplished by the use of nematocidally effective amounts of phosphoroamidothioates of the following formula:

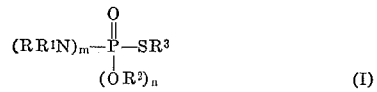

wheren R, $R^1$, $R^2$ and $R^3$ each independently represent a group of up to 12 carbon atoms consisting of alkyl, alkenyl, chloroalkyl or bromoalkyl and $R^3$ in addition may also represent cycloalkyl or alkynyl; $m=1$ or 2 and when $m=2$, $n=0$ and when $m=1$, $n=1$.

Typical examples of compounds which are employed according to the invention in addition to those given in the working examples include:

N,N-dimethyl O-ethyl S-ethyl phosphoroamidothicate
N,N-dimethyl O-isopropyl S-methyl phosphoroamidothioate
N,N-dimethyl O-propyl S-ethyl phosphoroamidothioate
N,N-dimethyl O-propyl S-butyl phosphoroamidothioate
N,N-dimethyl O-methyl S-hexyl phosphoroamidothioate
N,N-dimethyl O-ethyl S-hexyl phosphoroamidothioate
N,N-dimethyl O-ethyl S-cyclohexyl phosphoroamidothioate
N,N-dimethyl O-ethyl S-octyl phosphoroamidothioate
N,N-diethyl O-methyl S-butyl phosphoroamidothioate
N,N-diethyl O-methyl S-hexyl phosphoroamidothioate
N,N-diethyl O-methyl S-nonyl phosphoroamidothioate
N,N-diallyl O-ethyl S-hexyl phosphoroamidothioate
N,N-diallyl O-ethyl S-decyl phosphoroamidothioate
N,N,N',N'-tetramethyl S-methyl phosphorodiamidothioate
N,N,N',N'-tetramethyl S-ethyl phosphorodiamidothioate
N,N,N',N'-tetramethyl S-decyl phosphorodiamidothioate
N,N,N',N'-tetramethyl S-dodecyl phosphorodiamidothioate
N,N,N',N'-tetramethyl S-allyl phosphorodiamidothioate
N,N,N',N'-tetramethyl S-(2-propynyl) phosphorodiamidothioate
N,N,N',N'-tetramethyl S-(2-butenyl) phosphorodiamidothioate
N,N,N',N'-tetraethyl S-propyl phosphorodiamidothioate
N,N,N',N'-tetraethyl S-octyl phosphorodiamidothicate The compounds of the following formula comprise a preferred class of compounds according to the invention because of their effectiveness as residual nematocides.

wherein R, $R^1$ and $R^3$ have the meaning hereinbefore specified. Such active nematocides are typified in working Examples III and IV.

A preferred subclass of the compounds used according to the invention are those members of Formula II wherein R and $R^1$ represent alkyl of 1 to 4 carbon atoms. Such compounds are preferred because of their excellent nematocidal properties. Such compounds have exhibited high toxicity against nematodes attacking the roots of a wide variety of economically important crops. These compounds are effective nematocides when applied to the soil and yet at effective dosages will not adversely affect the growing plant.

The discovery of a novel class of effective nematocidal phosphorodiamidothioates is a further embodiment of the invention. Such compounds have been found to be highly active in in vitro screening tests and as well in trials wherein the compound was incorporated into nematode-infested soil. These phosphorodiamidothioates are characterized by the formula:

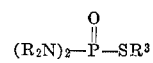

wherein R is alkyl of 1 to 4 carbon atoms and $R^3$ represents alkyl, cycloalkyl, monochloroalkyl or alkynyl of up to 12 carbon atoms. Such novel compounds of this class include for example:

N,N,N',N'-tetramethyl S-methyl phosphorodiamidothioate
N,N,N',N'-tetramethyl S-ethyl phosphorodiamidothioate
N,N,N',N'-tetramethyl S-propyl phosphorodiamidothioate
N,N,N',N'-tetramethyl S-isopropyl phosphorodiamidothioate
N,N,N',N'-tetramethyl S-butyl phosphorodiamidothioate
N,N,N',N'-tetramethyl S-sec. butyl phosphorodiamidothioate
N,N,N',N'-tetramethyl S-decyl phosphorodiamidothioate
N,N,N',N'-tetraethyl S-cyclohexyl phosphorodiamidothioate
N,N,N'-N'-tetramethyl S-(3-chloropropyl) phosphorodiamidothioate
N,N,N'-N'-tetramethyl S-(2-propynyl) phosphorodiamidothioate
N,N,N',N'-tetraethyl S-methyl phosphorodiamidothioate
N,N,N',N'-tetraethyl S-propyl phosphorodiamidothioate
N,N,N',N'-tetraisopropyl S-ethyl phosphorodiamidothioate
N,N,N',N'-tetraisopropyl S-butyl phosphorodiamidothioate
N,N,N',N'-tetrabutyl S-methyl phosphorodiamidothioate
N,N,N',N'-tetrabutyl S-ethyl phosphorodiamidothioate A particularly preferred subclass of these phosphorodiamidothioates are those members of Formula III where R represents methyl. Such compounds are preferred because of their high activity towards soil-borne nematodes and their residual properties in the soil.

The novel compound, N,N,N',N'-tetramethyl S-butyl phosphorodiamidothioate, is an especially preferred member of the class because of its outstanding performance in the laboratory and in the field as an effective nematocide. Furthermore this compound has exhibited a high degree of toxicity to certain soil insect pests.

An essential feature of the configuration of the compounds used according to the invention is the thio linkage to the phosphorus atom. It has been found that phosphoroamidothioates and phosphorodiamidothioates are highly effective nematocides while the corresponding phosphoroamidates and phosphorodiamidates do not possess such high activity against root parasitic nematodes in soil tests. Further the amidothioates and diamidothioates exhibit the unusual property of combined effectiveness against soil dwelling parasitic nematodes and root-feeding insects.

The phosphoroamidothioates and phosphorodiamidothioates of the invention are in general oily liquids, light yellow to brownish in color, having boiling points in the range of approximately 60° C. at 0.1 torr to approximately 150° C. at 6.5 torr. They are moderately soluble in most organic solvents such as methanol, ethanol, isopropanol, acetone and xylene.

The phosphoroamidothioates of the invention are readily prepared by reaction of the appropriate phosphoroamidite, $(RR^1N)P(OR^2)_2$, or phosphorodiamidite, $(RR^1N)_2P(OR)$, with the appropriate thiocyanate, $R^3SCN$, the reaction proceeding according to the equation:

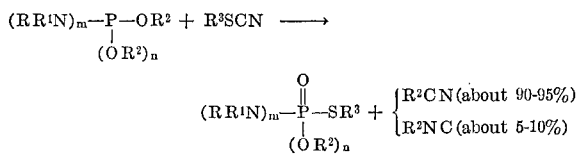

The reactions in general are exothermic, and may be carried out with or without solvents by mixing the reactants and heating, if necessary, to initiate the reaction. The products, high boiling liquids, are readily recovered and purified by distillation at very low pressures. If desired, the reaction may be moderated by inclusion of an inert solvent, aromatic liquids such as benzene, xylene, toluene being suitable for the purpose. The reaction is satisfactorily carried out by using about stoichiometric (mole/mole) proportions of the reactants.

The thiocyanate intermediates are known compounds, prepared by alkylation of an aqueous solution of KSCN or by boiling an alcoholic solution of KSCN with an alkyl bromide (about 1.1:1 mole ratio).

The phosphoroamidites can be prepared by reacting at from about −30° C. to 50° C., the appropriate alcohol and phosphorus trichloride to form the phosphorodichloridite. The product is then reacted further with alcohol in the presence of a tertiary amine base to form the phosphorochloridite, which is reacted with the appropriate amine (2 moles of amine per mole of phosphorochloridite) to form the desired phosphoramidite. The desired phosphorodiamidite is prepared in a similar manner by reacting the phosphorodichloridite with the amine (1:2 mole ratio), using ether or pentane as solvent.

The following examples are presented to illustrate typical preparations of compounds of the invention and to illustrate the biological effectiveness of selected compounds of the invention. The scope of the invention should not be regarded as being limited by the following illustrative examples.

EXAMPLE I

Preparation of N,N,N',N'-tetramethyl S-butyl phosphorodiamidothioate n-Butyl thiocyanate (5.7 g., 0.05 m.) was added dropwise with stirring to ethyl N,N,N',N'-tetramethylphosphorodiamidite (8.2 g., 0.05 m.) preheated to 40° C. The temperature rose spontaneously to 160° C. The mixture was allowed to cool and then Claisen distilled in vacuo to give 11.0 g. (96% yield) of N,N,N',N'-tetramethyl S-butyl phosphorodiamidothioate as a colorless liquid boiling at 91° C. at 0.1 mm. Hg, $n_D^{25}$ 1.5315. The structure was confirmed by infrared spectrum and elemental analysis.

Analysis.—Calcd. for $PN_2SOC_8H_{21}$ (percent): P, 13.85; N, 12.5; S, 14.3. Found (percent): P, 14.1; N, 11.6; S, 14.5.

In addition the following table summarizes the experimental data obtained in the preparation of related exemplary S-esters of N,N,N',N'-tetramethyl phosphorodiamidothioic acid:

| S-ester | Starting temp., ° C. | Boiling pt. ° C./torr | Index of refraction, $n_D^{25}$ | Yield, percent | P analysis Calc., percent, w. | Found, percent, w. |
|---|---|---|---|---|---|---|
| S-methyl | <0 | 63/0.01 | 1.4945 | 66 | 17.0 | 17.3 |
| S-ethyl | <0 | 76/0.3 | 1.4910 | 72 | 15.8 | 16.1 |
| S-hexyl | <20 | 98/0.08 | 1.4839 | 79 | 12.3 | 12.0 |
| S-cyclohexyl | 90 | 106/0.09 | 1.5096 | 88 | 12.4 | 12.3 |
| S-decyl | 75 | 136/0.06 | 1.4793 | 90 | 10.1 | 10.1 |
| S-propyl | 25 | 69–71/0.01 | | 87 | N-13.3 | N-13.3 |
| S-sec-butyl | 10 | 62–71/0.15 | | 49 | 13.8 | 14.2 |
| S-isopropyl | 25 | 106–111/6.3 | | 35 | 14.8 | 15.3 |
| S-(3-chloropropyl) | −15 | 111–113/0.1 | | 28 | 12.7 | 11.7 |

EXAMPLE II

Preparation of phosphoroamidothioate

In a manner similar to Example I the following exemplary S-esters of N,N-dimethyl-O-methyl phosphoroamidothioic acid were prepared and the experimental data obtained are given below:

| S-ester | Starting temp, ° C. | Boiling pt. ° C./torr | Index of refraction, $n_D^{25}$ | Yield, percent | P analysis Calc., percent, w. | P analysis Found, percent, w. |
|---|---|---|---|---|---|---|
| S-ethyl | <20 | 76/0.1 | 1.4792 | 75 | 16.9 | 16.5 |
| S-butyl | 40 | 86/0.1 | 1.4750 | 74 | 14.7 | 14.5 |
| S-octyl | 110 | 120/0.1 | 1.4726 | 75 | 11.6 | 10.8 |
| S-decyl | 110 | 128–30/0.08 | 1.4720 | 88 | 10.5 | 9.5 |

EXAMPLE III

Nematocide tests—water screen

In this test, the test compound at 1000 p.p.m. is suspended in water containing 0.05 percent by weight of nonylphenyl polyethoxy ethanol (Trion X–100) emulsifier. The test solution is inoculated with root-knot nematodes, *Meloidogyne incognita* (*Var. acrita*), which are exposed to the test solution for 24 hours. The mortality of the nematode larvae is obtained by transferring the treated larvae to nematode-free soil and seeding the soil with tomatoes which are indicator plants for root-knot infection. The percent control is obtained by comparison of the root infection of the treated larvae with soil inoculated with untreated larvae. The results obtained are summarized in Table I.

TABLE I

Control of root-knot nematode-water screen

Compound: Percent control at 1000 p.p.m.
- N,N - dimethyl O - methyl S-ethyl phosphoroamidothioate _____ 50
- N,N - dimethyl O-ethyl S-methyl phosphoroamidothioate _____ 100
- N,N-dimethyl O-isopropyl S-methyl phosphoroamidothioate _____ 50
- N,N - dimethyl O-methyl S-butyl phosphoroamidothioate _____ 100
- N,N-dimethyl O-ethyl S-butyl phosphoroamidothioate _____ 100
- N,N - dimethyl O-propyl S-hexyl phosphoroamidothioate _____ 100
- N,N - dimethyl O - ethyl S-heptyl phosporoamidothioate _____ 100
- N,N - dimethyl O-isopropyl S-octyl phosphoroamidothioate _____ 64
- N,N-dimethyl O-ethyl S-decyl phosphoroamidothioate _____ 92
- N,N - dimethyl O-ethyl S-dodecyl phosphoroamidothioate _____ 100
- N,N - diethyl O-ethyl S-butyl phosphoroamidothioate _____ 100
- N,N - diethyl O - methyl S-cyclohexyl phosphoroamidothioate _____ 83
- N,N - diethyl O - methyl S-heptyl phosphoroamidothioate _____ 91
- N,N - diethyl O-ethyl S-decyl phosphoroamidothioate _____ 100
- N,N - diethyl O - ethyl S-dodecyl phosphoroamidothioate _____ 79
- N,N - diisopropyl O-ethyl S-ethyl phosphoroamidothioate _____ 100
- N,N - diisopropyl O-methyl S-butyl phosphoroamidothioate _____ 83
- N,N - diisopropyl O-ethyl S-cyclohexyl phosphoroamidothioate _____ 50
- N,N - diisopropyl O-ethyl S-dodecyl phosphoroamidothioate _____ 76
- N,N - diallyl O - methyl S-methyl phosphoroamidothioate _____ 100
- N,N - diallyl O - methyl S-butyl phosphoroamidothioate _____ 93
- N,N - diallyl O-ethyl S-decyl phosphoroamidothioate _____ 59
- N,N,N',N' - tetramethyl S-propyl phosphorodiamidothioate _____ 93
- N,N,N',N' - tetramethyl S-(2-propynyl) phosphorodiamidothioate _____ 57
- N,N,N',N' - tetramethyl S - isopropyl phosphorodiamidothioate _____ 43
- N,N,N',N' - tetramethyl S - butyl phosphorodiamidothioate _____ 80
- N,N,N',N' - tetramethyl S-sec-butyl phosphorodiamidothioate _____ 79
- N,N,_-',N' - tetramethyl S-pentyl phosphorodiamidothioate _____ 86
- N,N,N',N' - tetramethyl S - (3 - chloropropyl) phosphorodiamidothioate _____ 100
- N,N,N',N' - tetraethyl S - butyl phosphorodiamidothioate _____ 100
- N,N,N',N' - tetraethyl S - cyclohexyl phosphorodiamidothioate _____ 100
- N,N,N',N' - tetraethyl S - octyl phosphorodiamidothioate _____ 79
- N,N,N',N' - tetraethyl S - nonyl phosphorodiamidothioate _____ 93
- N,N,N',N' - tetraethyl S-dodecyl phosphorodiamidothioate _____ 50
- N,N,N'N' - tetraisopropyl S-methyl phosphorodiamidothioate _____ 100

EXAMPLE IV

Nematocide tests—Soil mix

The compounds of the invention were thoroughly mixed with soil infested with the root-knot nematode, *Meloidogyne incognita* (*Var. acrita*). All tests were made in duplicate. In addition two-quart jars of untreated soil served as controls. The samples of soil were held at 80° F. for two and four weeks, then were transferred to 4-inch plant pots and seeded with tomatoes. Tomatoes are excellent indicator plants for evaluation of the presence of root-knot nematodes in the soil. After two and four weeks, the soil was washed from the roots of the plants and the number of root-knot galls, as evidence of the feeding of nematodes, was visually ascertained by experienced observers. The dosages used and the control of nematodes obtained at each dosage of each of the test compounds are set out in Table II. The percent control reported is an average of the two and four week results.

TABLE II. CONTROL OF ROOT-KNOT NEMATODES

| Compound: | Dosage, g./qt. | Control, percent |
|---|---|---|
| N,N-dimethyl O-methyl S-ethyl phosphoroamidothioate | 0.01 | 92 |
| N,N-dimethyl O-ethyl S-ethyl phosphoroamidothioate | 0.01 | 84 |
| N,N-dimethyl O-isopropyl S-ethyl phosphoroamidothioate | 0.04 | 57 |
| N-N-dimethyl O-methyl S-butyl posphoamidothioate | 0.01 | 80 |
| N-N-dimethyl O-ethyl S-cyclohexyl phosphoroamidothioate | 0.04 | 91 |
| N,N-diethyl O-methyl S-butyl phosphoroamidothioate | 0.01 | 90 |
| N,N-diethyl O-methyl S-hexyl phosphoroamidothioate | 0.04 | 63 |
| N,N-diethyl O-methyl S-cyclohexyl phosphoroamidothioate | 0.01 | 75 |
| N,N-diisopropyl O-methyl S-butyl phosphoroamidothioate | 0.04 | 84 |
| N,N-diallyl O-methyl S-ethyl phosphoroamidothioate | 0.01 | 75 |
| N,N-diallyl O-methyl S-butyl phosphoroamidothioate | 0.04 | 96 |
| N,N-diallyl O-ethyl S-nonyl phosphoroamidothioate | 0.04 | 50 |
| N,N,N',N'-tetramethyl S-ethyl phosphorodiamidothioate | 0.01 | 83 |
| N,N,N',N'-tetramethyl S-propyl phosphorodiamidothioate | 0.002 | 61 |
| N,N,N',N'-tetramethyl S-butyl phosphorodiamidothioate | 0.001 | 80 |
| N,N,N',N'-tetramethyl S-cyclohexyl phosphorodiamidothioate | 0.01 | 87 |
| N,N,N',N'-tetramethyl S-2-butenyl phosphorodiamidothioate | 0.01 | 58 |
| N,N,N',N'-tetraethyl S-butyl phosphorodiamidothioate | 0.01 | 80 |

EXAMPLE V

Other biological properties

*Insect toxicity.*—N,N,N',N' - tetramethyl S - butyl phosphorodiamidothioate has been found to be residually toxic in the soil to rootworm larvae. 10 p.p.m. mixed into the soil killed 100 percent of the rootworms after 14 days. After 28 days, 100 percent of the larvae were controlled at a dosage of 30 p.p.m. mixed into the soil. This compound exhibits toxicity as well to a number of other insects, for example the pea aphid, mosquito larvae and the two-spotted spider mite.

*Microbicide activity.*—Several of the phosphoroamidothioates of the invention were found active on a number of microorganisms in in vitro tests. For example, N,N,-diallyl O-methyl S-heptyl phosphoroamidothioate at 50 p.p.m. inhibited growth of nine species of microorganisms including bacteria, yeasts, and fungi.

*Anthelmintic activity.*—In laboratory tests N,N-diallyl O-ethyl S-cyclohexyl phosphoroamidothioate and N,N-diallyl O-ethyl S-propyl phosphoroamidothioate were effective in clearing mice of internal nematodes.

When used as agricultural pesticides the compounds used according to the invention may be formulated as liquids or as solid composition according to conventional methods known in the formulating art.

Liquid compositions containing up to 50% by weight of the desired amount of the active agent may be prepared by dissolving the chemical in an inert organic solvent such as xylene, acetone, isopropyl alcohol, carbon tetrachloride or the like. By the use of suitable emulsifying and dispersing agents these compounds (or phosphoroamido and diamidothioates) can be emulsified or dispersed in water and the emulsion applied to the soil to be treated to provide effective control of the nematodes or insects therein. Any of the usual emulsifying and dispersing agents commonly employed in forming aqueous emulsions and suspensions of water-insoluble materials can be used for this purpose. Generally but a small concentration of the emulsifying agent is required, as little as 0.05% of the weight of the final formulation being effective in many cases, while seldom will more than about 10% of the weight of the final formulation be required. Usually, the concentration of the emulsifying or dispersing agent will be from about 0.5 to about 5% of the weight of the formulation.

Solid formulations may be dusts, granules, or wettable powders. The active ingredient content in the case of dusts or granules can vary from about 1% to about 10% by weight of the total formulation. Wettable powders may contain about 25% to about 80% of the active ingredient on the same basis. Suitable diluents for agricultural solid formulations include clays such as the kaolinites and attapulgites, mineral diluents such as talc, pyrophyllite and chemically modified minerals such as precipitated calcium carbonate to mention a few. Wettable powder formulations contain in addition wetting, sticking and/or suspending agents.

The quantity of active ingredient used per acre will depend upon the particular nematode pest controlled. Generally dosages within the range of one pound to twenty pounds per acre will give control of nematodes in the soil.

A phosphoroamidothioate or phosphorodiamidothioate of the invention may be the sole active ingredient in a formulation, more than one such compound may be employed, or such a compound or compounds may be blended with other pesticides.

We claim as our invention:

1. The method of controlling nematodes which attack plants which comprises contacting said nematodes with a pesticidally effective amount of a compound of the formula:

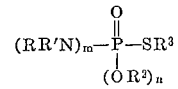

wherein R, $R^1$ and $R^2$ each independently represent a member selected from the group consisting of alkyl, alkenyl, chloroalkyl and bromoalkyl of 1 to 12 carbon atoms; $R^3=R$, $R^1$, $R^2$ and cycloalkyl and alkynyl of up to 12 carbon atoms; $m=2$ when $n=0$ and $m=1$ when $n=1$.

2. The method of claim 1 wherein $m=2$ and $n=0$.

3. The method of claim 2 wherein R and $R^1$ represent alkyl of 1 to 4 carbon atoms.

4. The method of claim 2 wherein the nematocidal compound is N,N,N',N'-tetramethyl S-butyl phosphorodiamidothioate.

References Cited

FOREIGN PATENTS 63,176 2/1961 Australia.
1,142,866 1/1963 Germany.

STANLEY J. FRIEDMAN, Primary Examiner.

U.S. Cl. X.R.

424—219